US011054079B2

(12) United States Patent
Phillips et al.

(10) Patent No.: US 11,054,079 B2
(45) Date of Patent: Jul. 6, 2021

(54) METHOD OF ACTIVE FREEWHEEL CONTROL OF A REMOTE-OPERATED PIPE CRAWLER VEHICLE

(71) Applicant: Deep Trekker Inc., Ayr (CA)

(72) Inventors: Sean Phillips, Waterloo (CA); Kyle Koerth, Kitchener (CA)

(73) Assignee: DEEP TREKKER INC., Ayr (CA)

( * ) Notice: Subject to any disclaimer, the term of this patent is extended or adjusted under 35 U.S.C. 154(b) by 675 days.

(21) Appl. No.: 15/964,049

(22) Filed: Apr. 26, 2018

(65) Prior Publication Data

US 2019/0331284 A1    Oct. 31, 2019

(51) Int. Cl.
*F16L 55/32* (2006.01)
*G05D 1/00* (2006.01)
*G05D 1/08* (2006.01)
*F16L 55/46* (2006.01)
*F16L 55/48* (2006.01)
*F16L 101/30* (2006.01)

(52) U.S. Cl.
CPC ............... *F16L 55/32* (2013.01); *F16L 55/46* (2013.01); *F16L 55/48* (2013.01); *G05D 1/0011* (2013.01); *G05D 1/0891* (2013.01); *F16L 2101/30* (2013.01); *G05D 2201/0207* (2013.01)

(58) Field of Classification Search
None
See application file for complete search history.

(56) References Cited

U.S. PATENT DOCUMENTS

| | | | |
|---|---|---|---|
| 9,395,725 B2* | 7/2016 | Bernstein | G05D 1/0891 |
| 2002/0102136 A1* | 8/2002 | Holland | B08B 9/049 |
| | | | 405/184.1 |
| 2018/0079475 A1* | 3/2018 | Trigui | B25J 15/0009 |
| 2019/0219216 A1* | 7/2019 | Weisenberg | F16L 55/18 |

* cited by examiner

*Primary Examiner* — Todd Melton
*Assistant Examiner* — Jason R Roberson (57) ABSTRACT

A method of active freewheel control (AFW) of a remote-operated pipe crawler vehicle provides a means of retrieving the pipe crawler vehicle after remote visual inspection of a pipe or other passage through a camera assembly on the pipe crawler vehicle. After the vehicle is remotely driven through the pipe to an inspection location, an operator may engage one or more modes to reverse the drive system of the vehicle back to the entry point of the pipe. The AFW system employs an arrangement of integrated sensors and software to intelligently control a simplified drive system that allows the crawler vehicle to assist motion when a tether connecting the vehicle to a control unit is pulled on.

8 Claims, 6 Drawing Sheets

METHOD OF ACTIVE FREEWHEEL CONTROL OF A REMOTE-OPERATED PIPE CRAWLER VEHICLE

FIELD OF THE INVENTION

The present invention relates generally to remote-operated vehicles. More particularly, the present invention relates to a method of controlling a remote-operated pipe crawler vehicle for retrieval.

BACKGROUND OF THE INVENTION

Pipeline video inspection is a form of telepresence used to visually inspect the interiors of pipelines. Many conventional pipe inspection crawler vehicle systems utilize a de-clutch method or a neutral gear method to allow the crawler to be pulled on for retrieval, resulting in mechanical complexity of a clutch mechanism of gear engagement actuator. The de-clutch method is susceptible to runaway due to slopes and cannot help overcome obstacles. Furthermore, many current pipe inspection crawler systems require a service vehicle to provide power and control to the crawler.

The present invention seeks to provide an improvement over current pipe inspection crawler systems by utilizing onboard batteries and a simplified mechanical drive system with no de-clutch system for easier retrieval, leaving more space on the crawler for batteries.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
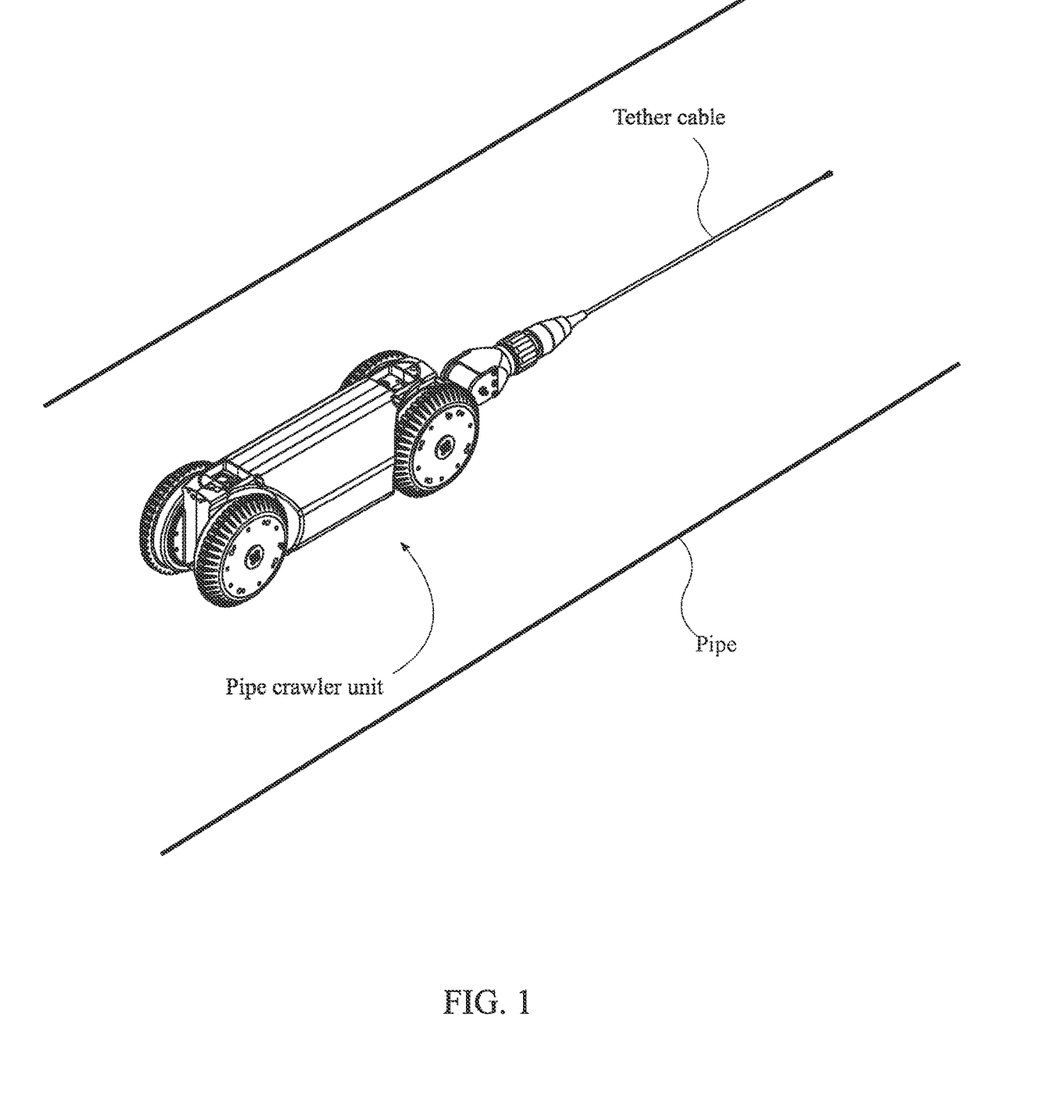
FIG. 1 is an illustration of the pipe crawler unit in accordance with some embodiments of the present invention.

The present invention is a method of controlling a remote-operated vehicle (ROV). More particularly, the present invention is a method of control of a remote-operated pipe crawler vehicle for retrieval of the pipe crawler vehicle after inspection of a pipe is completed or if the vehicle needs to be retrieved for any other reason. An example illustration of a pipe crawler unit with attached tether cable is shown in FIG. 1. The pipe crawler is controlled remotely through a control unit such as a hand-held controller connected to the pipe crawler through a tether. Some or all aspects of the present invention may in some embodiments be referred to as "Active Freewheel" (AFW) technology or control. AFW is a smart technology designed to sense when an operator is pulling a tether attached to the pipe crawler vehicle and actively engages the wheels of the vehicle to reverse and aid in a smooth and effortless retrieval of the vehicle. For example, when an inspection is complete the operator may simply press a Cruise Control (CC) button to engage the pipe crawler freewheel function. After pulling the tether back, the pipe crawler will provide power-assist and reverse the wheels, making the system very easy and lightweight to recover from a pipe.

In the preferred embodiment, the current AFW system employs an arrangement of integrated sensors and software to intelligently control a simplified drive system that allows the crawler vehicle to assist motion when pulled on.

In some embodiments of the present invention, there are two DC gear motors that drive the left and right sides of the crawler vehicle. The respective speeds of the left and right motors skid steer the vehicle. The motors are mechanically coupled to the front and rear wheels on their respective sides via gear sets and drive shafts, resulting in a four wheel or optional track drive platform.

Each motor is equipped with a rotary Hall Effect quadrature encoder that allows for measurement of the motor's speed and direction. Additionally, each motor's drive current is known from the integrated current sensing in the motor driver. The voltage to each motor is also known from a pulse width modulation (PWM) duty cycle as a percent of the supplied battery voltage. The motor control algorithms are computed in the on-board processor. Additionally, the crawler vehicle is equipped with an inertial measurement unit (IMU), which can give incline and roll angles of the crawler body.

In the preferred embodiment, the AFW system is based on the electromechanical behavior of a direct current (DC) motor, though it is noted that the present invention should not be limited in scope to solely DC motors. Motor torque (T) (and therefore wheel torque) is proportional to motor current (I). The relationship of motor torque (T), speed (RPM), current (I) and voltage (V) may be described as:

$$V = K_s (RPM) + R(I);$$

$$I = (V - K_s (RPM))/R;$$

$$T = K_t I;$$

Therefore: $V = T k_1 + k_2 \, RPM$.

For AFW it is desired to have a standby torque ($Tk_1$) which overcomes the crawler's internal friction so that it feels frictionless when pulled. Additionally, the torque output of the motor is reduced as the motor's speed is increased. The output voltage then needs to increase as the motor speed increases ($k_2 \, RPM$).

In addition, the voltage can be reduced or increased by the sensed current of the motors. This compensates for parameter sensitivity, where if $K_1$ and $K_2$ are too large the AFW won't stop and they are too low it will have limited performance. Therefore, a current override is employed to enhance performance. A current threshold is selected and the PWM duty cycle can be changed proportionally to how far over or under the actual motor current is. This method enables pull sensing on the crawler. The active freewheel is used on the average of motor feedback on both motors and outputs an average duty cycle to the motors.

The AFW technique further allows for advanced methods such as active steering during AFW and gravity compensation. Steering temporarily adds and subtracts from the left and right motor outputs based on user inputs to course correct the reversing of the crawler. Gravity compensation can be done by adding or subtracting duty cycle based on the incline/decline angle of the crawler vehicle, where the additional duty cycle is based on a sine function of the angle.

A HOLD feature is also included in AFW where the crawler will continue to drive on its own once pulled on. This is accomplished by increasing the parameter related to motor speed to create a deliberate run-away condition. The HOLD feature doesn't require the crawler to be pulled on after the initial pull start.

In some embodiments, the general process of using AFW is as follows:

User sets crawler to AFW;

User selects HOLD or RAMP (RAMP is conventional ramp to stop functionality);

User pulls on crawler tether to retrieve crawler. For RAMP, the crawler will stop when the user stops pulling on the tether and for HOLD it will continue to drive as long as it's in the AFW mode. AFW mode can be disabled at any time from a button on the hand-held controller.

In some embodiments, when first activated, the pipe crawler freewheel action automatically enters a "RAMP" mode. This will enable the pipe crawler to power assist wheel movement when pulling back on the tether, and also slow down to safely stop when there is no longer tension on the tether. This is the safest way to ensure the pipe crawler does not roll down an unwanted area and gives the operator the opportunity to be monitoring the video feed and make small course corrections.

Furthermore, another feature of the present invention may be referred to as a "HOLD" mode, which is a rapid method of retrieving the pipe crawler from a pipe. The HOLD mode will reverse the pipe crawler at full speed after pulling the tether is pulled. The operator can set the function and then, once ready, begin the automatic top speed reverse of the crawler once they pull back on the tether. In this situation, the pipe crawler will automatically reverse at an ideal speed for the operator to reel the tether onto the reel. With this option, one person can complete an inspection and have their reel and tether ready to pack up after retrieving the pipe crawler. In some embodiments, the crawler will automatically switch to RAMP mode once a counter distance for the tether goes under a certain value, such as, but not limited to, 2.5 meters or 8.2 feet. At the beginning of the inspection the operator sets the tether counter to 0 at the edge of the pipe, so now the system will automatically know when the vehicle is reaching the end. This will allow the vehicle to gradually slow down as it reaches the manhole. Furthermore, at any time, the operator may switch between HOLD and RAMP modes by applying the appropriate inputs to the controller.

Figure 2:
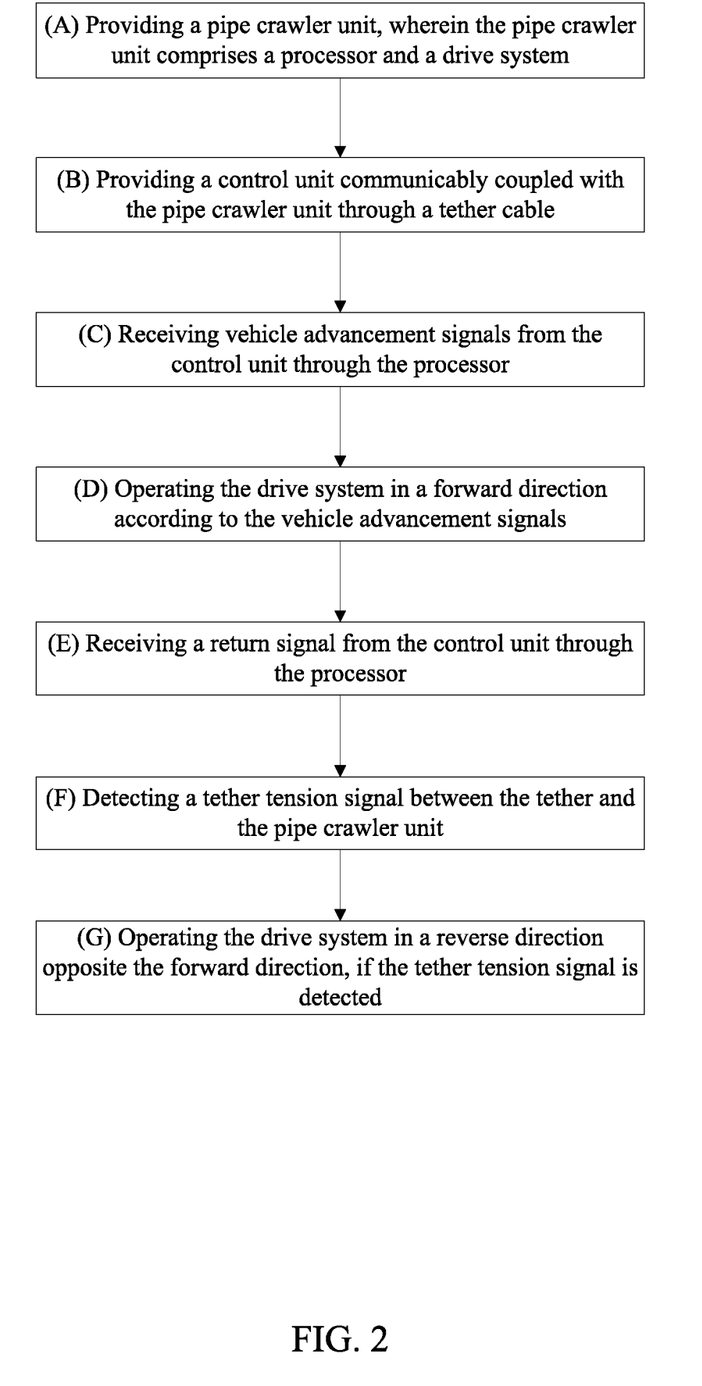
FIG. 2 is a stepwise flow diagram describing the general method of the present invention.

In general, referring to FIG. 2, in the method of the present invention, a pipe crawler unit is provided, wherein the pipe crawler unit comprises a processor and a drive system (Step A). A control unit is further provided in the method, wherein the control unit is communicably coupled with the pipe crawler unit through a tether cable (Step B.) The pipe crawler unit may vary in different embodiments. In the preferred embodiment, the pipe crawler unit further comprises a camera assembly. The camera assembly records live video which is sent to and displayed on the control unit or connected digital display through the tether cable.

In various embodiments, the pipe crawler unit may comprise various forms, components and systems that may enable the pipe crawler unit to perform various functions. In general, it is desired that the pipe crawler unit be durable, able to withstand the grueling environments of municipal infrastructure, and portable, requiring no topside power or dedicated trucks, being powered by an internal battery. The pipe crawler unit should additionally be sleek and lightweight. The processor of the pipe crawler unit may be understood to be any singular component or combination of components such as, but not limited to, central processing units, microprocessors, signal processors, integrated circuits, or the like, which may facilitates any and all necessary and desired electronic computation and communication with the various other electrical and electronic components of the pipe crawler unit for proper functionality. In some embodiments, the drive system of the pipe crawler system may comprise two front wheels and two rear wheels, and/or a track drive system. For simplicity, it is desired that steering of the pipe crawler unit be facilitated through relative differences in speed of the left and right wheels or alternative drive components, also known as skid steer. However, it is contemplated that any relevant means and method of steering may be comprised in the present invention.

In some embodiments, the control unit may be a handheld electronic controller unit and may comprise various user interface components, such as, but not limited to, buttons, switches, digital displays, and other typical features of such a controller. In some embodiments, the control unit may be a laptop computer, a mobile device such as a tablet computer or smartphone, or any other device capable of operating computer-executable instructions stored on a non-transitory computer-readable medium and communicating electronically with the pipe crawler unit.

Initially, vehicle advancement signals are received from the control unit through the processor (Step C). The drive system of the pipe crawler unit is then operated in a forward direction according to the vehicle advancement signals (Step D). In a real-world application scenario, the pipe crawler unit is inserted through an entry point into a pipe or other small, enclosed passage unsuitable for human presence, and advanced through the pipe in order to inspect any points of interest within the pipe through the camera assembly. Once inspection is finished, or for any other reason, the pipe crawler unit should be retrieved. In most cases, an exit point near the ultimate inspection site is not available and the pipe crawler unit must retrace its path to the original entry point. Thus, an operator may input a command to the control unit to return, and a return signal is received from the control unit through the processor (Step E). More particularly, in some embodiments, the user operating the control unit must either input one or more commands or cease to input any commands to the control unit before sending the return signal. Moreover, in some embodiments, the user must bring the pipe crawler unit to a stop and subsequently select one or more return modes (RAMP or HOLD) through the control unit in order to send the return signal.

Figure 3:
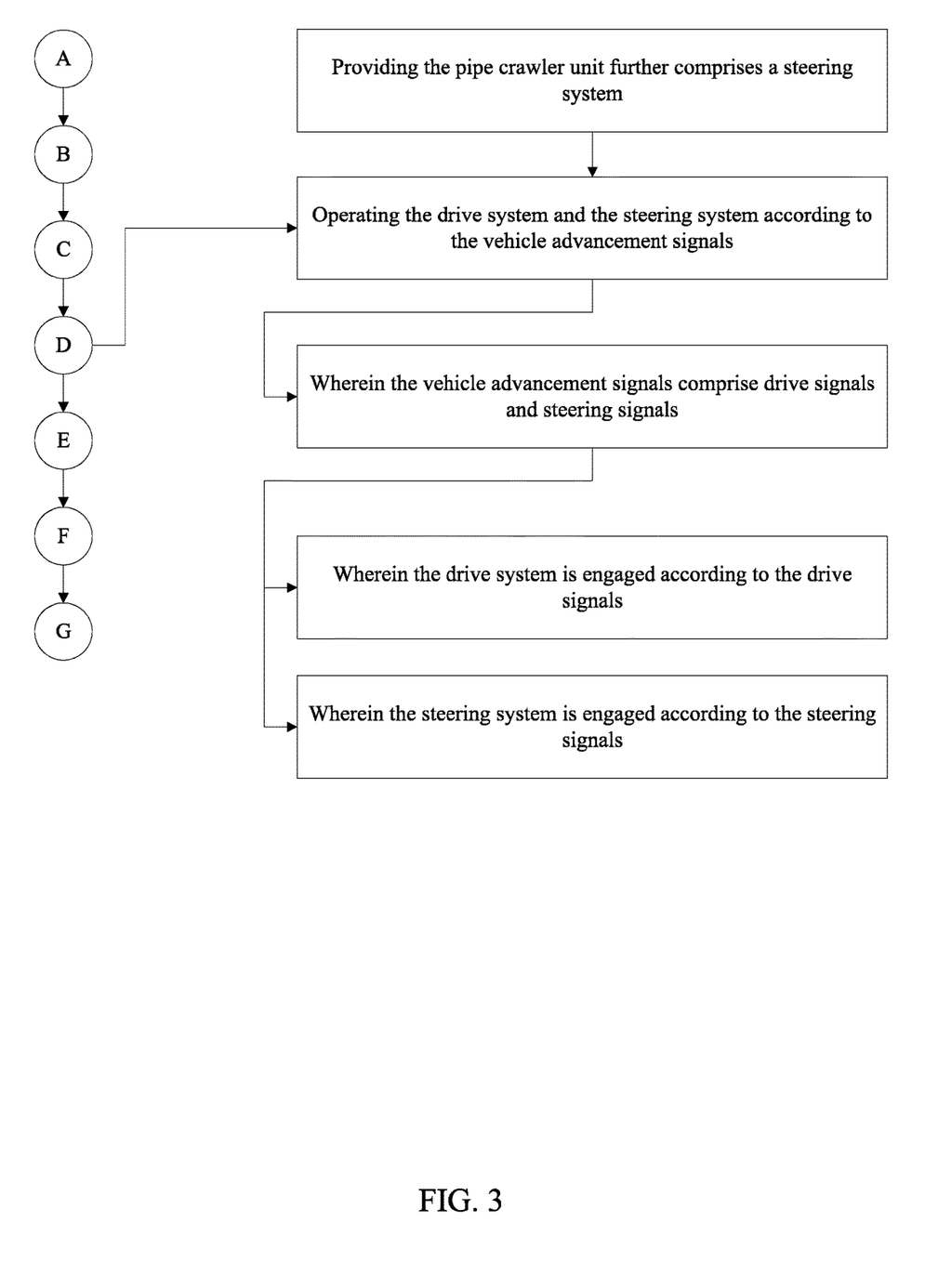
FIG. 3 is a stepwise flow diagram describing steps for operating the drive and steering systems in accordance with some embodiments of the present invention.

Once the return signal is received through the processor (Step E), a tether tension signal may be detected between the tether and the pipe crawler unit (Step F). In general, it is contemplated that many different means may be undertaken to accomplish this purpose. For example, a tension sensor may be connected to or integrated into the tether or connection point between the tether and the pipe crawler unit. Furthermore, in some embodiments, tension on the tether may be detected indirectly through measuring voltage, current or other appropriate aspect of any motors responsible for driving the wheels or other drive system of the pipe crawler unit, as previously described. While otherwise known to be at rest, a current measured above a specified threshold at an appropriate location, such as across one or more motors or other relevant electrical connections, may be used to indicate a pull on the tether. After the return signal is received by the processor, and if the tether tension signal is detected, the drive system is then operated in a reverse direction opposite the forward direction in order to reverse the pipe crawler back towards the original entry point of the pipe (Step G). Furthermore, providing that the pipe crawler unit further comprises a steering system, the drive system and the steering system are operated according to the vehicle advancement signals, as illustrated in FIG. 3. Even more particularly, the vehicle advancement signals may comprise drive signals and steering signals, such that the drive system is engaged according to the drive signals, and the steering system is engaged according to the steering signals. It may be noted herein that in the case of a skid steer type steering system, there may not be physically separate systems for controlling forward motion and steering action; rather, forward motion is accomplished through both left and right wheels being activated at the same speed, while steering is accomplished through activating the left and right wheels at different speeds.

Figure 4:
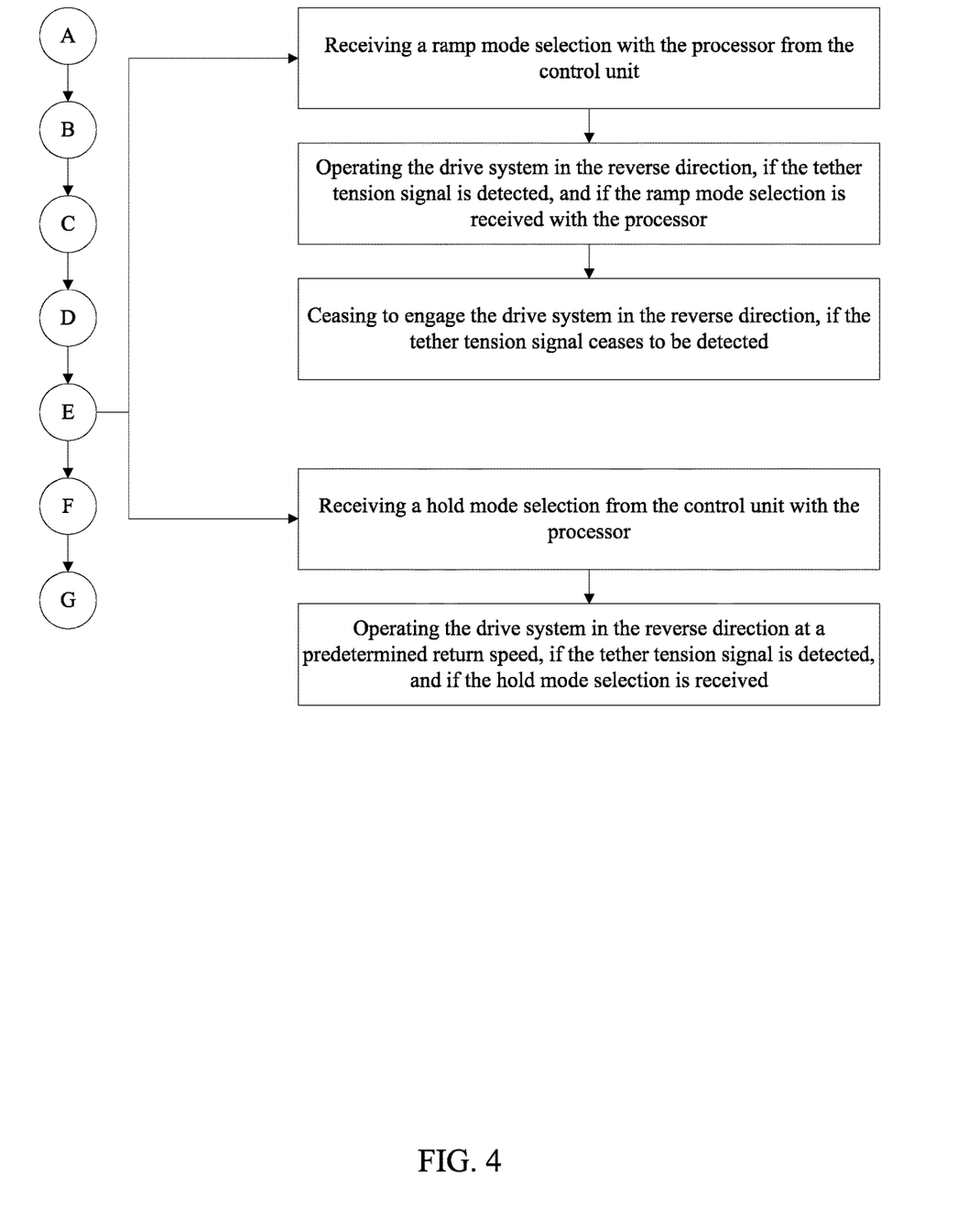
FIG. 4 is a stepwise flow diagram describing steps for engaging the drive system in ramp and hold modes in accordance with some embodiments of the present invention.

Referring to FIG. 4, as previously mentioned, the preferred embodiment of the present invention provides two distinct modes of operation for retrieval of the pipe crawler unit—a RAMP mode and a HOLD mode. Thus, in the RAMP mode, a RAMP mode selection is received with the processor from the control unit. The drive system is then operated in the reverse direction if the tether tension signal is detected, and if the ramp mode selection has been received with the processor. Furthermore, in RAMP mode, if the tether tension signal ceases to be detected, the drive system is ceased to be engaged. Thus, while in RAMP mode, the pipe crawler unit provides power assist to the operator pulling on the tether to retrieve the pipe crawler unit, but only while the operator continuously pulls on the tether.

Figure 5:
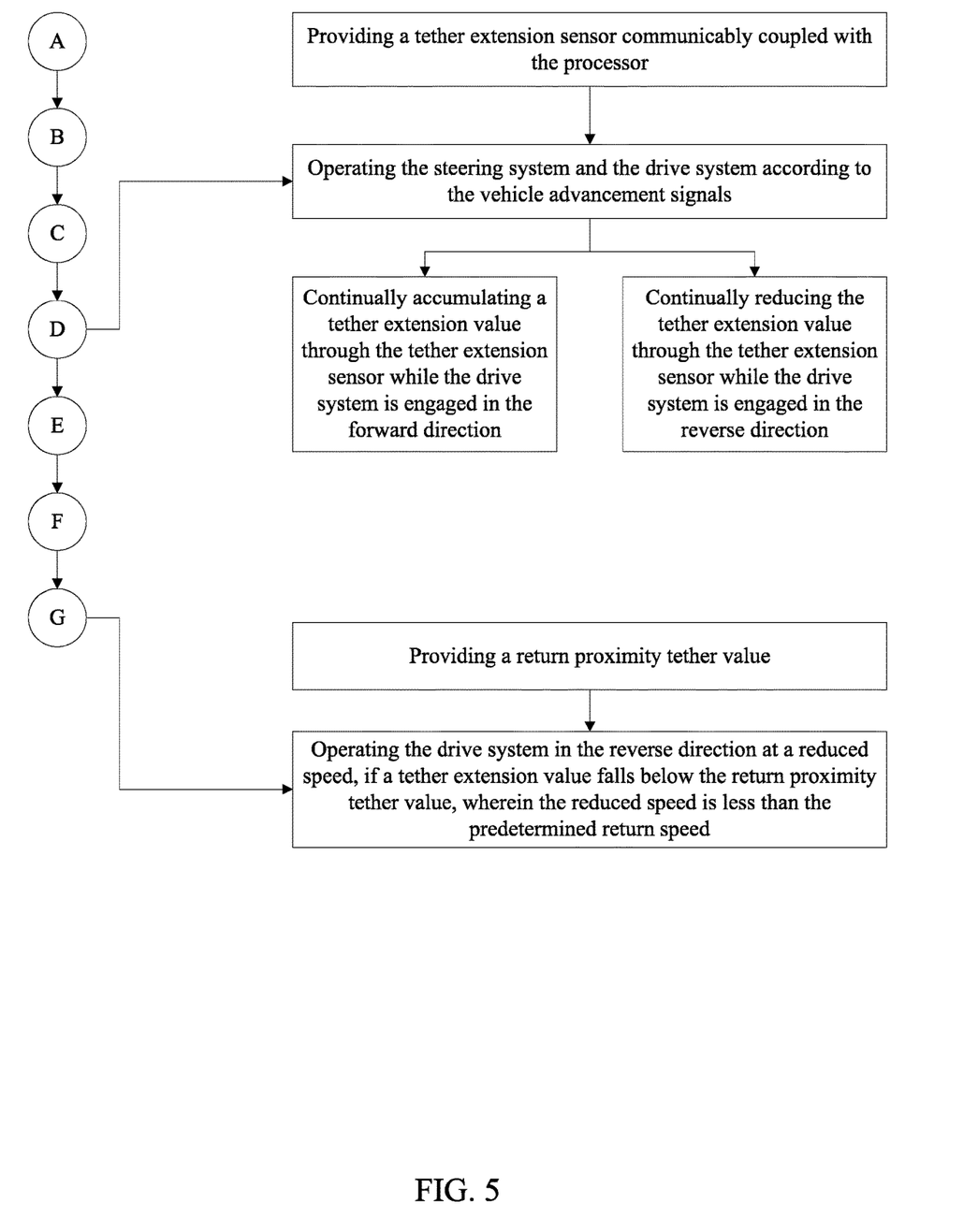
FIG. 5 is a stepwise flow diagram describing steps for measuring and utilizing a tether extension value in accordance with some embodiments of the present invention.

In the preferred embodiment, in HOLD mode, the pipe crawler unit will reverse at full speed after the tether is pulled. The operator can set the HOLD function and, once ready, begin the automatic top speed reverse of the crawler by pulling on the tether. Thus, a HOLD mode selection may be received from the control unit with the processor, and the drive system is then operated in the reverse direction at a predetermined return speed if the hold mode selection is received and if the tether tension signal is detected. Furthermore, in HOLD mode, preferably the pipe crawler unit will automatically switch to RAMP mode once the pipe crawler unit has come near to the original entry point. Thus, a return proximity tether value is provided in the system, as shown in FIG. 5. The return proximity tether value represents the threshold of the distance between the pipe crawler unit and the manhole or other point of entry to the pipe.

Referring to FIG. 5, in some embodiments, a tether extension sensor is communicably coupled with the processor. The type and configuration of tether extension sensor may vary in different embodiments. While the steering system and the drive system are activated according to the vehicle advancement signals, a tether extension value is continually accumulated through the tether extension sensor while the drive system is engaged in the forward direction. Conversely, while the drive system is engaged in the reverse direction, the tether extension value is continually reduced. The instantaneous accumulation or reduction of the tether extension value, or tether count, should be proportional to the instantaneous speed of the drive system. Thus, if the tether extension value falls below the return proximity tether value while in HOLD mode, the drive system is then operated in the reverse direction at a reduced speed, wherein the reduced speed is less than the predetermined return speed. It should further be noted that the operator may at any time switch between HOLD and RAMP modes through the control unit.

Figure 6:
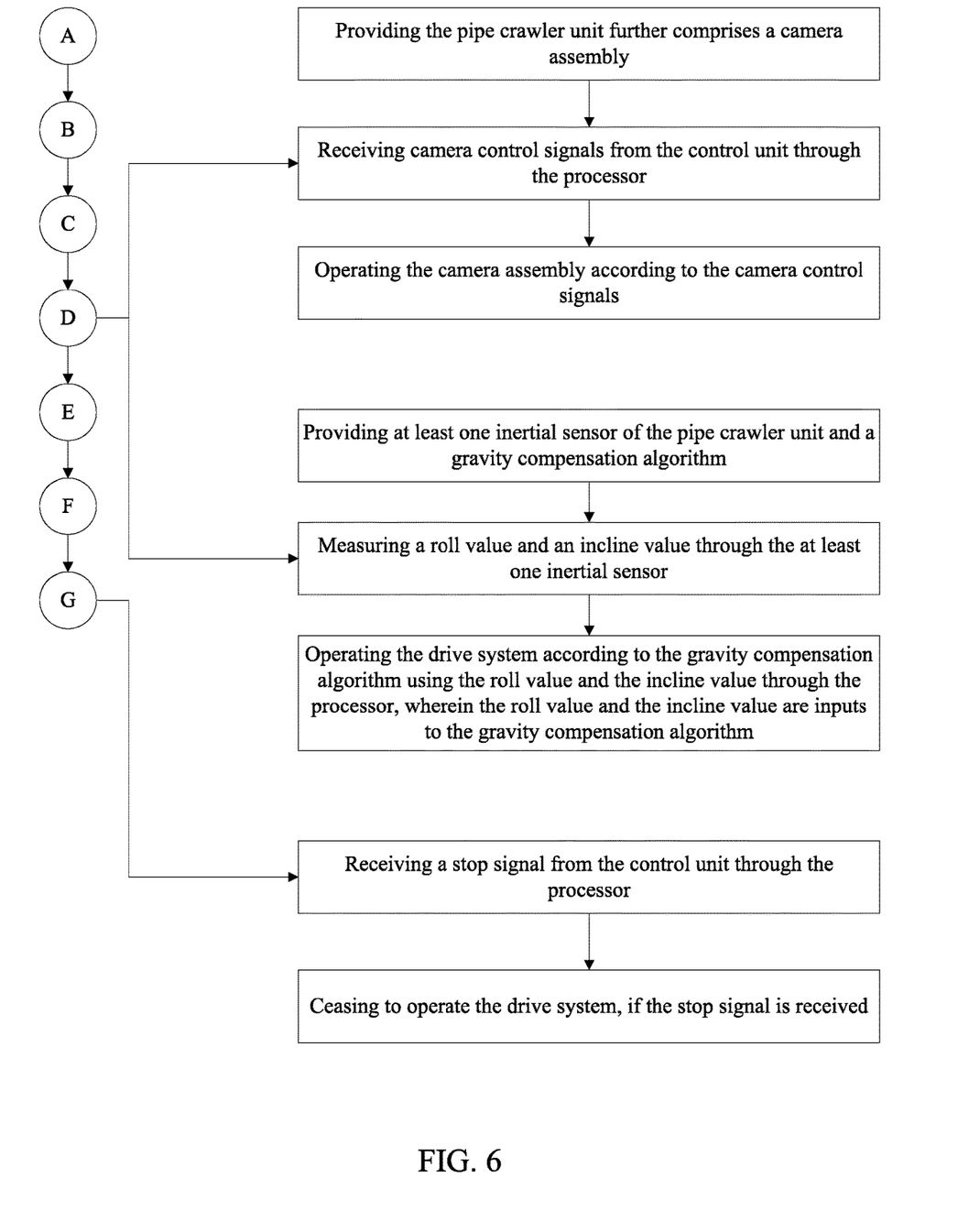
FIG. 6 is a stepwise flow diagram describing steps for implementing various aspects in accordance with some embodiments of the present invention.

Referring to FIG. 6, another feature in the present invention is that at any time the operator may choose to immediately stop the pipe crawler unit from moving as a fail-safe measure or for any other reason. The operator may, for example, press a button on the control unit to exit any AFW modes. More particularly, a stop signal may be received from the control unit through the processor, and subsequently the drive system is ceased to operate, if the stop signal is received.

In another aspect, the pipe crawler may further comprise at least one inertial sensor, such as, but not limited to, an inertial measurement unit (IMU), in addition to a gravity compensation algorithm present in the software of the present invention. Thus, at least one roll value and/or at least one incline value may be measured through the at least one inertial sensor. The drive system may then be operated according to the gravity compensation algorithm using the roll value and the incline value through the processor, wherein the roll value and the incline value are inputs to the gravity compensation algorithm. As previously mentioned, the gravity compensation algorithm may operate by adding or subtracting duty cycle to the left and/or right motor outputs of the pipe crawler unit based on the roll value and/or the incline value measured by the IMU.

As previously mentioned, the preferred embodiment of the present invention further comprises a camera assembly. The camera assembly may be considered to be fundamentally important to the spirit and intended function of the pipe-crawler unit of the present invention, since the purpose of the pipe-crawler unit is to remotely perform visual inspections of pipes and other municipal structures inaccessible to humans or inconvenient to access. Thus, camera control signals may be received from the control unit through the processor, and the camera assembly is operated according to the camera control signals. The camera assembly may comprise one, two, or more individual cameras or any type, including, but not limited to, optical, infrared, ultraviolet, night vision, laser, or other types of cameras. The camera assembly may further include at least one light source to illuminate the immediate surroundings of the pipe crawler unit. The camera assembly may comprise one or more arms which may be independently controlled in one, two, or three linear dimensions and/or radial directions, enabling the operator to manipulate the camera assembly for a full range of observation around the pipe crawler unit.

Although the invention has been explained in relation to its preferred embodiment, it is to be understood that many other possible modifications and variations can be made without departing from the spirit and scope of the invention as hereinafter claimed.

What is claimed is:

1. A method of controlling a remote-operated pipe crawler vehicle comprises the steps of:
- (A) providing a remote-operated pipe crawler vehicle, wherein the remote-operated pipe crawler vehicle comprises a processor and a drive system;
- (B) providing a control unit communicably coupled with the remote-operated pipe crawler vehicle through a tether cable;
- (C) receiving vehicle advancement signals from the control unit through the processor;
- (D) operating the drive system in a forward direction according to the vehicle advancement signals;
- (E) receiving a return signal from the control unit through the processor;
- (F) detecting a tether tension signal between the tether and the remote-operated pipe crawler vehicle; and
- (G) operating the drive system in a reverse direction opposite the forward direction, if the tether tension signal is detected;
- receiving a hold mode selection from the control unit with the processor;
- operating the drive system in the reverse direction at a predetermined return speed, if the tether tension signal is detected, and if the hold mode selection is received;
- providing a return proximity tether value; and
- operating the drive system in the reverse direction at a reduced speed, if a tether extension value falls below the return proximity tether value, wherein the reduced speed is less than the predetermined return speed.

2. The method as claimed in claim 1 comprises the steps of:
- providing the remote-operated pipe crawler vehicle further comprises a steering system; and
- operating the drive system and the steering system according to the vehicle advancement signals.

3. The method as claimed in claim 2,
- wherein the vehicle advancement signals comprise drive signals and steering signals;
- wherein the drive system is engaged according to the drive signals, and
- wherein the steering system is engaged according to the steering signals.

4. The method as claimed in claim 1 comprises the steps of:
- receiving a ramp mode selection with the processor from the control unit;
- operating the drive system in the reverse direction, if the tether tension signal is detected, and if the ramp mode selection is received with the processor; and
- ceasing to engage the drive system in the reverse direction, if the tether tension signal ceases to be detected.

5. The method as claimed in claim 1 comprises the steps of:
- providing a tether extension sensor communicably coupled with the processor;
- activating the steering system and the drive system according to the vehicle advancement signals;
- continually accumulating a tether extension value through the tether extension sensor while the drive system is engaged in the forward direction; and
- continually reducing the tether extension value through the tether extension sensor while the drive system is engaged in the reverse direction.

6. The method as claimed in claim 1 comprises the steps of:
- receiving a stop signal from the control unit through the processor; and
- ceasing to operate the drive system, if the stop signal is received.

7. The method as claimed in claim 1 comprises the steps of:
- providing the remote-operated pipe crawler vehicle further comprises a camera assembly;
- receiving camera control signals from the control unit through the processor; and
- operating the camera assembly according to the camera control signals.

8. The method as claimed in claim 1 comprises the steps of:
- providing at least one inertial sensor of the remote-operated pipe crawler vehicle and a gravity compensation algorithm;
- measuring a roll value and an incline value through the at least one inertial sensor; and
- operating the drive system according to the gravity compensation algorithm using the roll value and the incline value through the processor, wherein the roll value and the incline value are inputs to the gravity compensation algorithm.

* * * * *